United States Patent [19]

Suzuki et al.

[11] Patent Number: 4,652,893

[45] Date of Patent: Mar. 24, 1987

[54] INK-JET RECORDING APPARATUS

[75] Inventors: Yuji Suzuki, Yokohama; Syunsuke Hattori, Kawasaki, both of Japan

[73] Assignee: Kabushiki Kaisha Toshiba, Kawasaki, Japan

[21] Appl. No.: 843,248

[22] Filed: Mar. 24, 1986

[30] Foreign Application Priority Data

Mar. 28, 1985 [JP] Japan .................................. 60-64438

[51] Int. Cl.[4] ...................... G01D 15/16; G01D 15/10

[52] U.S. Cl. ............................ 346/140 R; 346/76 PH

[58] Field of Search ........................... 346/140, 76 PH

[56] References Cited

U.S. PATENT DOCUMENTS 4,608,577 8/1986 Hori ................................ 346/140 R

FOREIGN PATENT DOCUMENTS 60-71260 4/1985 Japan .

*Primary Examiner*—Joseph W. Hartary
*Attorney, Agent, or Firm*—Oblon, Fisher, Spivak, McClelland & Maier

[57] ABSTRACT

An ink-jet recording apparatus includes a film having a number of holes for holding ink. The film is driven in a predetermined direction near a recording paper. Ink is supplied to the holes by an ink supply mechanism. Ink in desired holes are heated by a thermal head to be ejected onto the recording paper. The thermal head is supported by a bimorph cell. In accordance with a voltage supplied from a voltage generator, the bimorph cell exponds or contracts to move the thermal head between a first position wherein the thermal head is adjacent to the recording paper and in contact with the film and a second position wherein the thermal head is separated from the recording paper and film.

10 Claims, 12 Drawing Figures

FIG. 9
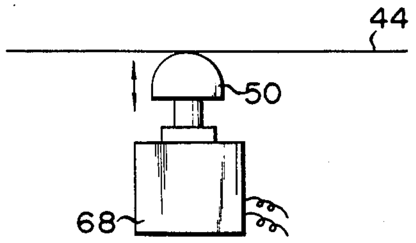
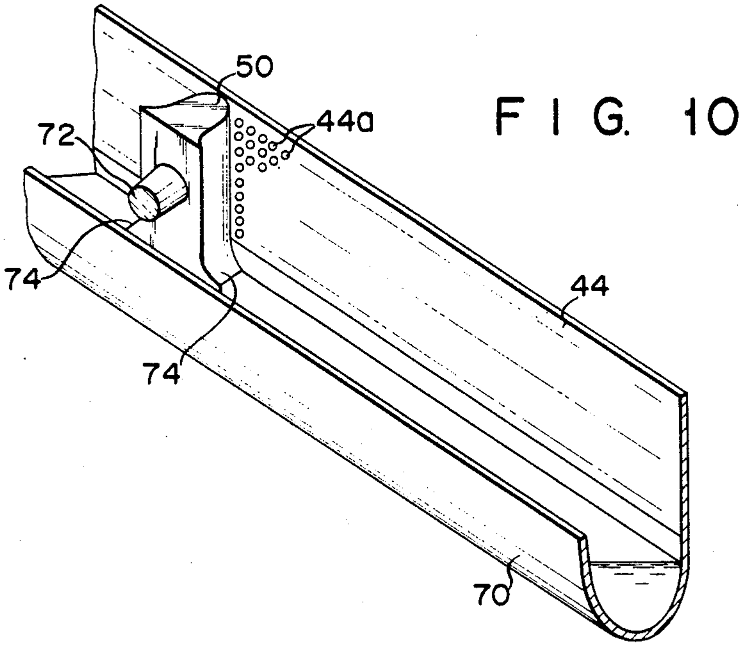
FIG. 10
FIG. 11
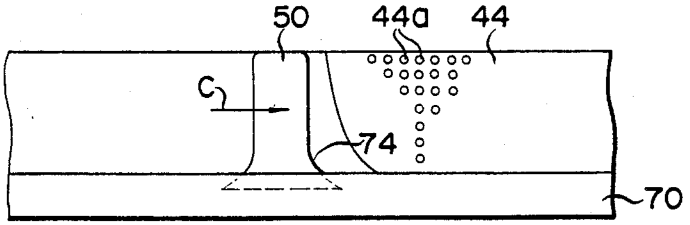
FIG. 12
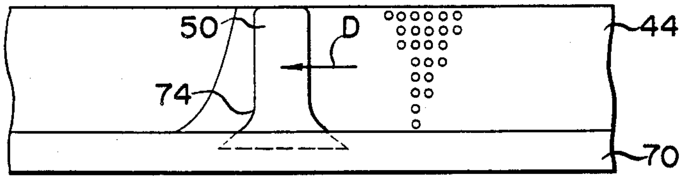

INK-JET RECORDING APPARATUS

BACKGROUND OF THE INVENTION

The present invention relates to a recording apparatus and, more particularly, to an ink-jet recording apparatus which ejects, through heat, ink particles from an ink-coated film to a recording medium, thereby performing recording.

Methods for printing data on a recording medium (e.g., paper) are generally classified into impact and non-impact methods. A non-impact recording apparatus produces less noise than an impact recording apparatus, and can be more compact.

Non-impact type recording apparatuses are classified into several types, one of which is an ink-jet recording apparatus. In an ink-jet recording apparatus, ink particles are ejected from a nozzle onto a recording medium, thereby forming dots thereon. For this reason, this apparatus allows color recording with ease. However, the nozzle clogs easily, and the apparatus has but poor reliability.

In recent years, an ink-jet recording apparatus which is substantially free of nozzle clogging has been proposed. This apparatus uses a film, running in a predetermined direction, adjacent to a recording surface of a recording medium. A large number of small holes (e.g., having a diameter of tens of microns) are formed in the film at a pitch of tens of microns. An ink supply mechanism for filling ink in these holes of the film is arranged in contact with a surface (rear surface) of the film, away from the recording surface. A thermal head, which contacts the rear surface of the film, is arranged downstream of the ink supply mechanism with reference to the film running direction. A large number of heating elements are arranged on the surface of the thermal head at a predetermined pitch in the widthwise direction of the film. The ink supply mechanism and the thermal head are moved more slowly than the film in the same direction as the film.

With this apparatus, ink is filled in the small holes of the film by the ink supply mechanism, forms droplets when heated by the thermal head. The ink particles are ejected onto the recording surface of the recording medium. When desired heating elements are energized, the ink filled in those small holes passing on the energized heating elements melts into ink particles, which will be ejected onto the recording surface. Hence, the ink in the small holes of the film corresponding to a dot image can be used for recording.

However, the ink-jet recording apparatus as described above has the following problems. Since the thermal head contacts a surface of the film at a given pressure, the thermal head is quickly worn does not last long. In addition, the temperature of the film is raised by the friction between the thermal head and the film, and too much ink is ejected to the recording medium, thus degrading recording quality.

SUMMARY OF THE INVENTION

Accordingly, it is the object of the present invention to provide an ink-jet recording apparatus which can eliminate wear of a thermal head and achieve high-quality recording.

In order to achieve the above object, an ink-jet recording apparatus comprises a supporting mechanism for supporting a thermal head and for moving the thermal head between a position adjacent to a recording surface of a recording medium and a position separated from the recording surface and a film, in accordance with an external position control signal; and control signal supply means for supplying the position control signal corresponding to an input recording signal.

The control signal supply means supplies the control signal to the supporting mechanism to move the thermal head to the position separated from the recording surface and the film when no recording data in input, or to separate the thermal head from the recording surface by a distance corresponding to a level of input recording data.

BRIEF DESCRIPTION OF THE DRAWINGS

FIGS. 1 to 7 show an ink-jet recording apparatus according to an embodiment of the present invention, in which:

FIG. 1 is a perspective view of the overall recording apparatus,

FIG. 2 is a plane view of a carriage when a housing of a cassette case is removed, FIG. 3 is an enlarged perspective view of an essential part of the apparatus, FIG. 4 is a sectional view taken along line IV—IV of FIG. 2, FIG. 5 is a block diagram of a control device of the apparatus in FIG. 1, FIG. 6 is a view showing the relationship between a position of a heating element of the thermal head and surface temperature, and FIG. 7 is an illustration showing a position of the heating element and ink flying distance;

FIGS. 8 and 9 are schematic plane views of different modifications of a supporting mechanism of the thermal head; and FIG. 10 is a perspective view showing a modification of an ink supply device, and FIGS. 11 and 12 are schematic side views of the operation of the supply device shown in FIG. 10.

DETAILED DESCRIPTION OF THE PREFERRED EMBODIMENT

An embodiment of the present invention will now be described in detail with reference to the accompanying drawings.

Figure 1:
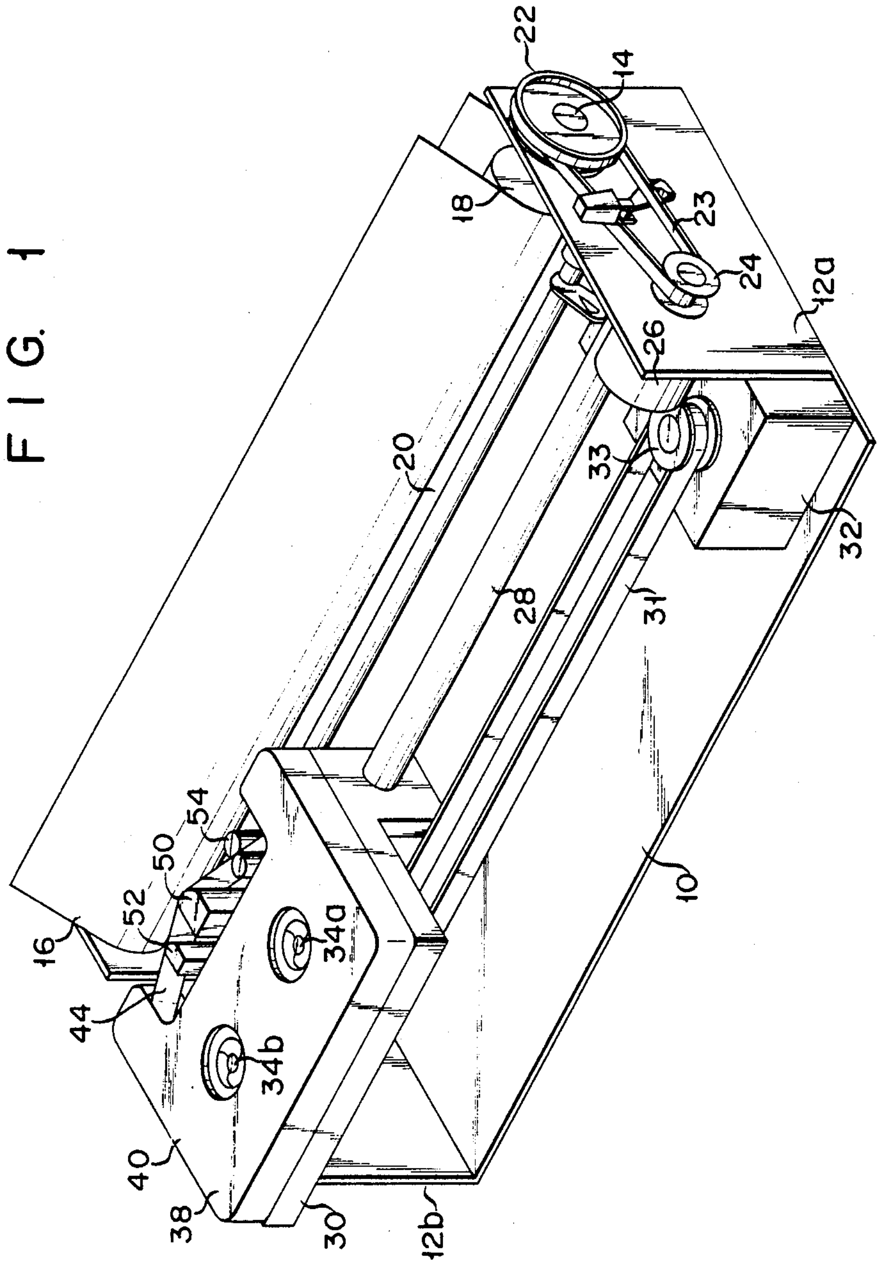

As shown in FIG. 1, an ink-jet recording apparatus comprises frame 10. Support walls **12*a* and 12*b* vertically extend from two ends of frame 10 to be parallel to each other. Bearings (not shown) are mounted on walls 12*a* and 12*b* to be coaxial with each other, and rotatably support shaft 14 therebetween. Feed roller 18 for feeding recording paper 16 is mounted on an outer peripheral portion of shaft 14, between walls 12*a* and 12*b*. A plurality of pinch rollers (not shown) for selectively pressing paper 16 against roller 18 are arranged below roller 18. Rod-like regulating member 20 for regulating the feed direction of paper 16 is arranged in front of roller 18, with reference to the paper-feed direction. Pulley 22 is fixed to one end of shaft 14, and pulley 24 is coupled to a driving shaft of motor 26 fixed to wall 12*a*. Rubber belt 23 is wound around pulleies 22 and 24. When motor 26 is driven, paper 16 is fed by roller 18** in a predetermined direction.

Guide shaft 28 is arranged opposite and parallel to the side surface of roller 18, and has two ends fastened to walls **12*a* and 12*b*. Carriage 30 is supported by guide shaft 28 to be slidable in its axial direction. Rubber belt 31 is looped between walls 12a and 12b, and one end thereof is coupled to carriage 30. Motor 32 for driving carriage 30 is attached to frame 10, and one end portion of belt 31 is wound around pulley 33 fixed to the rotating shaft of motor 32**.

As shown in FIGS. 1 to 4, reel driving shafts 34a and 34b extend from the upper surface of carriage 30. Shaft 34a is coupled to reel driving motor 36 to be rotated. Film cassette 38 is mounted on the upper surface of carriage 30. Cassette 38 comprises case 40 having opening 39 open toward paper 16. Case 40 houses a pair of reels 41a and 41b, which are engaged with shafts 34a and 34b to always receive a driving force in a given direction, and a pair of guide rollers 42a and 42b. Film 44 is wound around reels 41a and 41b and rollers 42a and 42b and runs in one direction in an endless state upon rotation of the reels. Film 44 is exposed from opening 39 of case 40 to face paper 16. A large number of small holes 44a acting as ink holding portions and having a diameter of several tens of micrometers are formed at a pitch of several tens of micrometers in film 44, like that in the conventional apparatus. Roller 42b is movable along a direction indicated by arrow A in FIG. 2 (i.e., a direction perpendicular to paper 16), and support shaft 45 thereof extends downward through case 40 and the upper surface of carriage 30. Shaft 45 is biased toward paper 16 by leaf spring 46 connected to the rear surface of carriage 30. Thereby, roller 42b gives a predetermined tension to film 44. Roller 42b and spring 46 constitute tension mechanism 48. Note that in FIG. 4, reference numeral 49 denotes a stopper for regulating excess movement of roller 42b.

Carriage 30 supports thermal head 50 which contacts that surface of film 44 away from paper 16 (i.e., the rear surface) to be located within opening 39 of cassette 38; ink supply mechanism 52 arranged upstream of head 50 with reference to the running direction of film 44, for supplying ink to small holes 44a of film 44; and ink removing mechanism 54 arranged at the downstream side of head 50 for heating film 44 to evaporate the ink from film 44.

A plurality of heating elements 50a are arranged on a contact surface of head 50 with film 44, at equal intervals in the widthwise direction of film 44. Head 50 is attached to one end of plate-like bimorph cell 56 (a supporting mechanism). The other end of cell 56 is connected to carriage 30 through mounting base 57. Cell 56 deforms from a position shown in FIG. 3 to separate from paper 16 upon application of a voltage. By controlling the voltage applied to cell 56, head 50 is movable between a first position (indicated by a solid line in FIG. 2), at which it is in contact with film 44 and faces paper 16, and a second position (indicated by a broken line in FIG. 2) at which it is separated from paper 16 and film 44.

Figure 5:
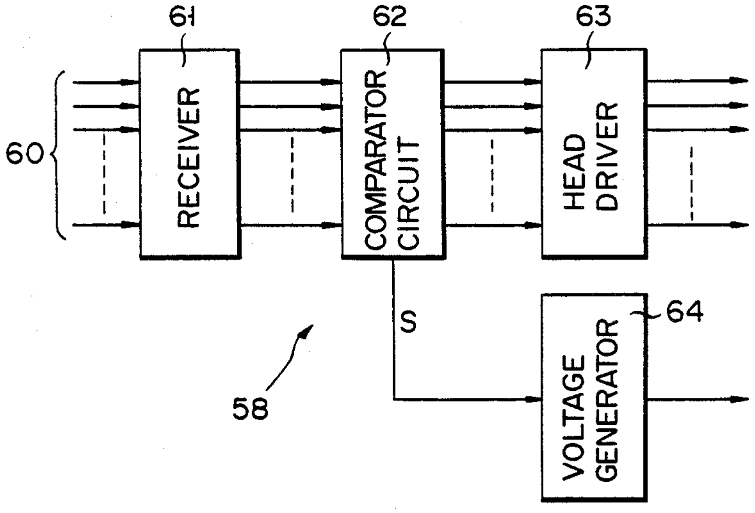

Elements 50a of head 50 and bimorph cell 56 are energized by head control device 58 shown in FIG. 5. In device 58, input recording data 60 (equal to as many elements 50a as specified) is supplied to receiver 61 and then to head driver 63 through comparator circuit 62. In response to this, driver 63 energizes corresponding elements 50a while the recording data is input. Comparator circuit 62 supplies signal S to voltage generator 64 while all input data goes to 0 level. Generator 64 applies an output voltage to bimorph cell 56 during a supply interval of signal S. In response to this, cell 56 deforms in a direction to separate from paper 16, thereby moving head 50 to the second position.

Figure 3:
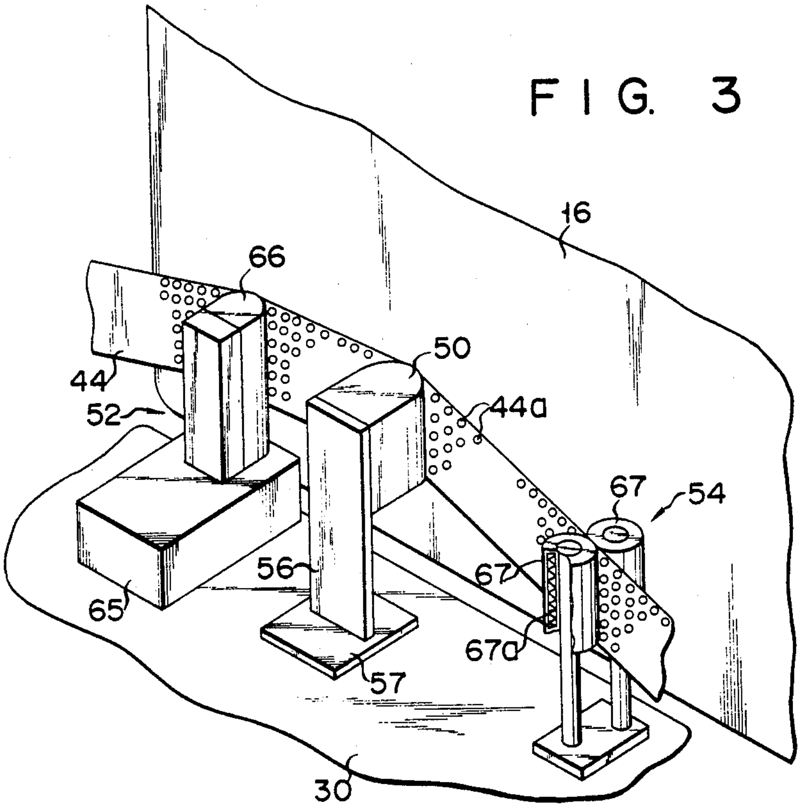
Figure 4:
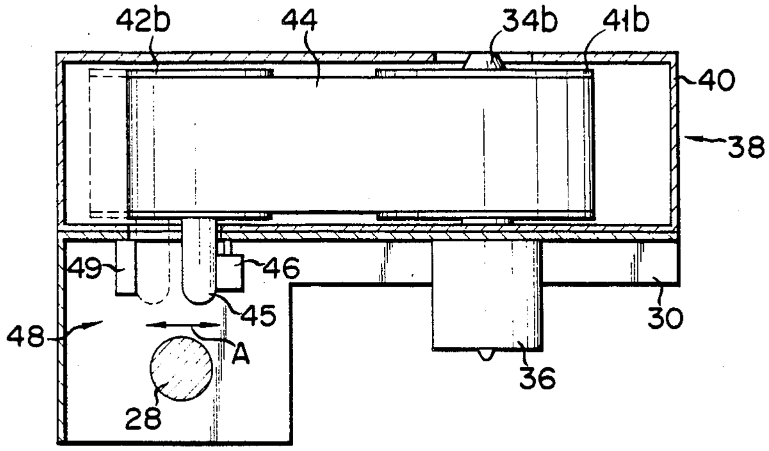

As shown in FIG. 3, mechanism 52 has tank 65, which containing ink and attached to carriage 30, and ink rod 66 made of sponge, with one end dipped in the ink in tank 65 and the other end contacting the rear surface of film 44. Mechanism 54 has a pair of heating rollers 67 rotatably supported on carriage 30 and clamping film 44 therebetween. Heater 67a is housed in each roller 67.

The operation of the ink-jet recording apparatus with the above arrangement will now be described.

Carriage 30 is moved by motor 32 in a predetermined direction along guide shaft 28, and film 44 is driven by motor 36 in the same direction as carriage 30. Film 44 runs faster than carriage 30. The operation of motors 32 and 36 is controlled by a control system (not shown). When film 44 is driven, ink is sequentially filled in small holes 44a of film 44 by mechanism 52. If recording data is input to control device 58, head 50 is moved to the first position, at which it is in contact with the rear surface of film 44, and elements 50a corresponding to the input recording data are energized. Consequently, ink filled in holes 44a on energized elements 50a is heated by elements 50a to form droplets, which are then ejected from film 44 onto the recording surface of paper 16. Thus, desired recording data can be recorded on paper 16. Residual ink in holes 44a which is passed by head 50 and ink attached to the surface of film 44 is heated by heating rollers 67 and evaporate from film 44.

When no input data is input to device 58, element 56 deforms, in accordance with a voltage supplied from generator 64, in a direction to separate from paper 16, thereby moving head 50 to the second position.

After one line of data is recorded, carriage 30 is returned to its initial position by motor 32, and at the same time, motor 26 is driven to move paper 16 at a predetermined pitch. Thereafter, the above operation is repeated.

According to the recording apparatus with the arrangement as above, although a recording principle thereof is unchanged, wear of head 50 can be eliminated unlike in a conventional apparatus, and recording precision can be improved. More specifically, head 50 is moved by bimorph cell 56 to a position separated from paper 16 and film 44 when all recording data is at "0" level, that is, when no recording operation is required. For this reason, wear of head 50 can be reduced, in comparison with the conventional apparatus in which a thermal head contacting the film at a given pressure at all time. Thus, it is possible to prolong head life. Since head 50 is separated from film 44 during a non-recording state, temperature rise of the film due to the friction between the head and film can be supressed. Therefore, this prevents degradation in recording precision due to an increase in film temperature.

Figure 6:
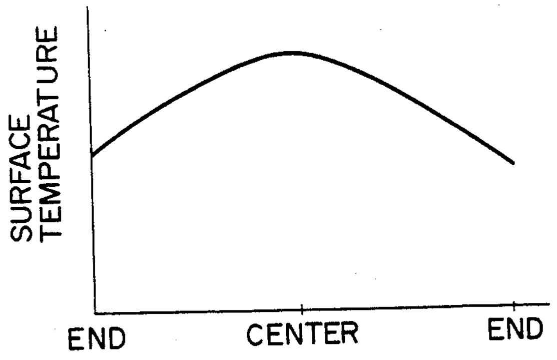
Figure 7:
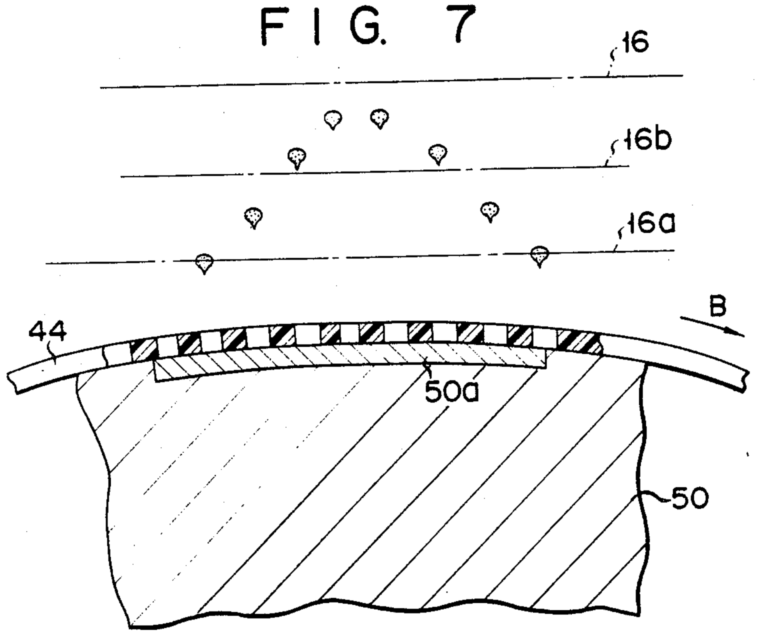

Gradation recording can also be performed with the above arrangement, since head 50 can be located between the first and second positions. As shown in FIG. 6, when heating element 50a is energized, its surface temperature is highest at its central portion and lowest at its two ends, with respect to running direction B of film 44. As shown in FIG. 7, a pitch and a diameter of holes 44a of film 44 are set such that a plurality of holes 44a can be located on single element 50a. As described above, since the surface temperature of element 50a is highest at its central portion and lowest at its two ends, an amount of heat supplied from element 50a to ink in holes 44a is also largest at the central portion and smallest at the two ends thereof. For this reason, as shown in FIG. 7, a flying distance of an ink droplet ejected from hole 44*a* at the central portion of element 50*a* is longest, and those from holes 44*a* at two ends thereof are shortest. Therefore, in FIG. 7, when paper 16 is arranged at position 16*a* with respect to head 50, all the ink droplets ejected from holes 44*a* become attached to paper 16, thus realizing dark-image recording. When paper 16 is arranged at position 16*b*, only ink droplets at the central portion of element 50*a* become attached to paper 16, thus realizing light-image recording.

Figure 2:
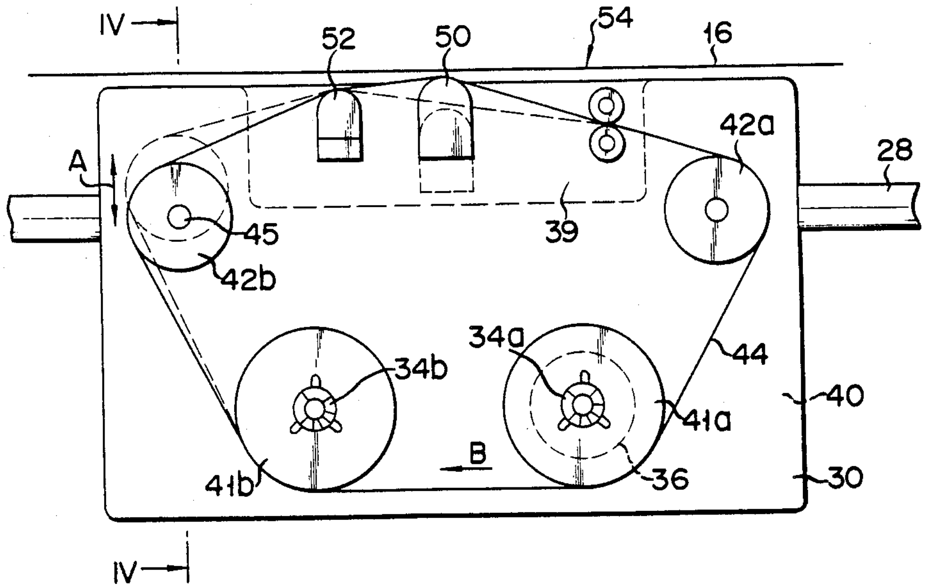

In the above embodiment, the position of head 50 can be arbitrarily set by adjusting level of a voltage supplied to element 56. When head 50 is moved in a direction to separate from paper 16, as shown in FIG. 2, roller 42*b* of tension mechanism 48 moves in a direction to approach paper 16 and to give uniform tension to film 44. Therefore, while head 50 moves from the first position to a position immediately before the second position, film 44 moves in a direction to separate from paper 16 with still contacting head 50. Thus, by energizing bimorph cell 56 in accordance with the level of input recording data, a distance between head 50 and paper 16 is set to the value corresponding to the level of input recording data, and gradation recording is achieved. When gradation recording is performed, comparator circuit 62 of control device 58 calculates an average level of the input recording data and energizes generator 64 in accordance with the calculated level. In this case, recording resolution can also be improved.

Figure 8:
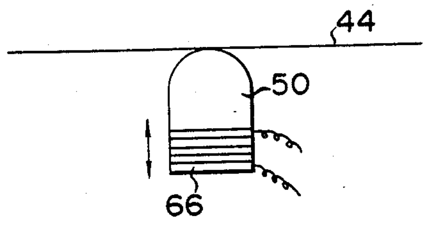

Note that the present invention is not limited to the above embodiment, and various changes and modifications may be made within the spirit and scope of the invention. For example, a support mechanism for movably supporting the thermal head can comprise multilayered piezoelectric elements 66, as shown in FIG. 8. Alternatively, as shown in FIG. 9, the support mechanism can comprise voice coil motor 68.

In the above embodiment, the ink holding portion of the film is constituted by small holes, but can be recesses open toward the recording paper. In this case, an ink supply mechanism is provided to be in contact with the front surface of the film.

In the above embodiment, the film is driven only in one direction to perform unidirectional recording, but it can be driven in two directions to perform bidirectional recording. The above embodiment adopts a serial printing method in which film is endlessly driven, but can be applied to a recording apparatus adopting a line printing method.

Furthermore, the ink supply mechanism can be constructed as shown in FIG. 10. With this modification, film 44 is arranged parallel to a recording surface of a recording paper, and ink reservoir 70 is arranged parallel and below film 44. Head 50 is arranged so that its lower end portion is dipped in the ink in reservoir 70, and is supported by the carriage through supporting member 72 and a support mechanism similar to that in the above embodiment. Curved surface 74, which gradually extends toward the lower end of head 50, is formed at the lower end portion of head 50 and two side surfaces thereof crossing the extending direction of reservoir 70.

In this modification, when head 50 is moved in a direction indicated by arrow C in FIG. 11, ink in reservoir 70 is guided along surface 74 and propagates upward along the surface of film 44. Therefore, ink can be automatically supplied to small holes 44*a* of film 44 upon movement of head 50. Similarly, as shown in FIG. 12, when head 50 is moved in a direction indicated by arrow D, ink is automatically supplied to small holes 44*a* of film 44. With this modification, the ink supply mechanism need not be in contact with film 44, and frictional loss of film 44, which easily occurs during ink supply, can be eliminated.

A mechanism for removing ink from the film is not limited to the above-mentioned heat evaporating method but can adopt a wipe-out method.

What is claimed is:

1. An ink-jet recording apparatus which records data on a recording surface of a recording medium in accordance with input recording data, comprising:

a film having a plurality of ink holding portions;

drive means for driving said film in a predetermined direction near the recording surface of said recording medium;

an ink supply mechanism for supplying ink to said ink holding portions of said film;

a thermal head for heating desired ink holding portions to eject ink in the heated ink holding portions onto the recording surface;

signal supply means for generating a position control signal in accordance with the input recording data; and a supporting mechanism for supporting said thermal head and for moving said thermal head between a first position at which said thermal head is adjacent to the recording surface and is in contact with said film, and a second position at which said thermal head is separated from the recording surface and film in accordance with the position control signal generated from said signal supply means.

2. An apparatus according to claim 1, wherein said supporting mechanism has a bimorph cell which supports said thermal head and receives a voltage to deform by an amount corresponding thereto, and said signal supply means has a voltage generator for applying a voltage to said bimorph cell in accordance with the input recording data.

3. An apparatus according to claim 2, wherein said signal supply means has means for supplying a control signal to said voltage generator to generate a voltage so that said bimorph cell deviates to move said thermal head to the second position when the input recording data is at "0" level.

4. An apparatus according to claim 2, wherein said signal supply means has means for supplying a control signal to said voltage generator to generate a voltage corresponding to a level of the input recording data so that said thermal head is moved to a position corresponding to the level between the first and second positions.

5. An apparatus according to claim 1, which further comprises a tension mechanism for giving a predetermined tension to said film so that said film is moved to separate from said recording medium in a state wherein said film is in contact with said thermal head while said thermal head is moved from the first position to a position immediately before the second position.

6. An apparatus according to claim 1, wherein said drive means comprises a carriage which is movable with facing the recording surface of said recording medium and supports said supporting mechanism and said ink supply mechanism, a pair of reel drive shafts rotatably supported by said carriage, a motor which is fixed to said carriage and rotate said reel drive shafts, and a pair of reels engaged with said reel drive shafts, and said film is wound around said reels in an endless manner.

7. An apparatus according to claim 6, which further comprises a tension mechanism for giving predetermined tension to said film so that said film is moved to separate from said recording medium in a state wherein said film is in contact with said thermal head while said thermal head is moved from the first position to a position immediately before the second position.

8. An apparatus according to claim 7, wherein said tension mechanism includes a guide roller engaged with said film and arranged on said carriage to be rotatable and movable in a predetermined direction, and a biasing member for biasing said guide roller in the predetermined direction to give a tension to said film.

9. An apparatus according to claim 1, wherein said ink holding portions have a large number of small holes formed in said film.

10. An apparatus according to claim 1, wherein said supporting mechanism has a voice coil motor supporting said themal head.

* * * * *